(12) United States Patent
Means et al.

(10) Patent No.: US 11,805,048 B1
(45) Date of Patent: Oct. 31, 2023

(54) DYNAMIC NETWORK METRIC SHARING AND APPLICATION METRIC BASED NETWORK PATH SELECTION

(71) Applicant: AT&T Intellectual Property I, L.P., Atlanta, GA (US)

(72) Inventors: Israel Means, Chula Vista, CA (US); Barry Elia, King George, VA (US); Mark Lyn, Tampa, FL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/730,977

(22) Filed: Apr. 27, 2022

(51) Int. Cl.
  *H04L 45/12* (2022.01)
  *H04L 45/24* (2022.01)
  *H04L 45/125* (2022.01)
  *H04L 45/302* (2022.01)
  *H04L 45/42* (2022.01)

(52) U.S. Cl.
  CPC .......... *H04L 45/123* (2013.01); *H04L 45/125* (2013.01); *H04L 45/24* (2013.01); *H04L 45/306* (2013.01); *H04L 45/42* (2013.01)

(58) Field of Classification Search
  CPC ..... H04L 45/123; H04L 45/125; H04L 45/24; H04L 45/306
  See application file for complete search history.

(56) References Cited

U.S. PATENT DOCUMENTS

| | | | | |
|---|---|---|---|---|
| 9,807,035 | B1* | 10/2017 | Hanks | H04L 49/15 |
| 10,374,945 | B1* | 8/2019 | Dhanabalan | H04L 45/306 |
| 11,522,787 | B1* | 12/2022 | Kolar | H04L 41/5009 |
| 2022/0029906 | A1* | 1/2022 | Mahesh | H04L 47/2408 |
| 2022/0393967 | A1* | 12/2022 | Solanki | H04L 12/4641 |

OTHER PUBLICATIONS

"Border Gateway Protocol", https://en.wikipedia.org/wiki/Border_Gateway_Protocol, Accessed Apr. 12, 2022, 20 pages.

* cited by examiner

*Primary Examiner* — Abdulkader M Alriyashi
(74) *Attorney, Agent, or Firm* — GUNTIN & GUST, PLC; Mark Wilinski

(57) ABSTRACT

Aspects of the subject disclosure may include, for example, receiving network performance metrics for a plurality of paths through a network, each path extending from a customer equipment to an application server for data communication by the customer equipment with an application running on the application server, selecting a selected path among the plurality of paths, wherein the selecting is based on the network performance metrics, and communicating between the customer equipment and the application server according to the selected path. Border gateway protocol (BGP) community values (BGP CV) add BGP performance metrics community values (BPM CV) to convey network performance metrics to provider edge routers and customer premises equipment for network selection. Other embodiments are disclosed.

20 Claims, 8 Drawing Sheets

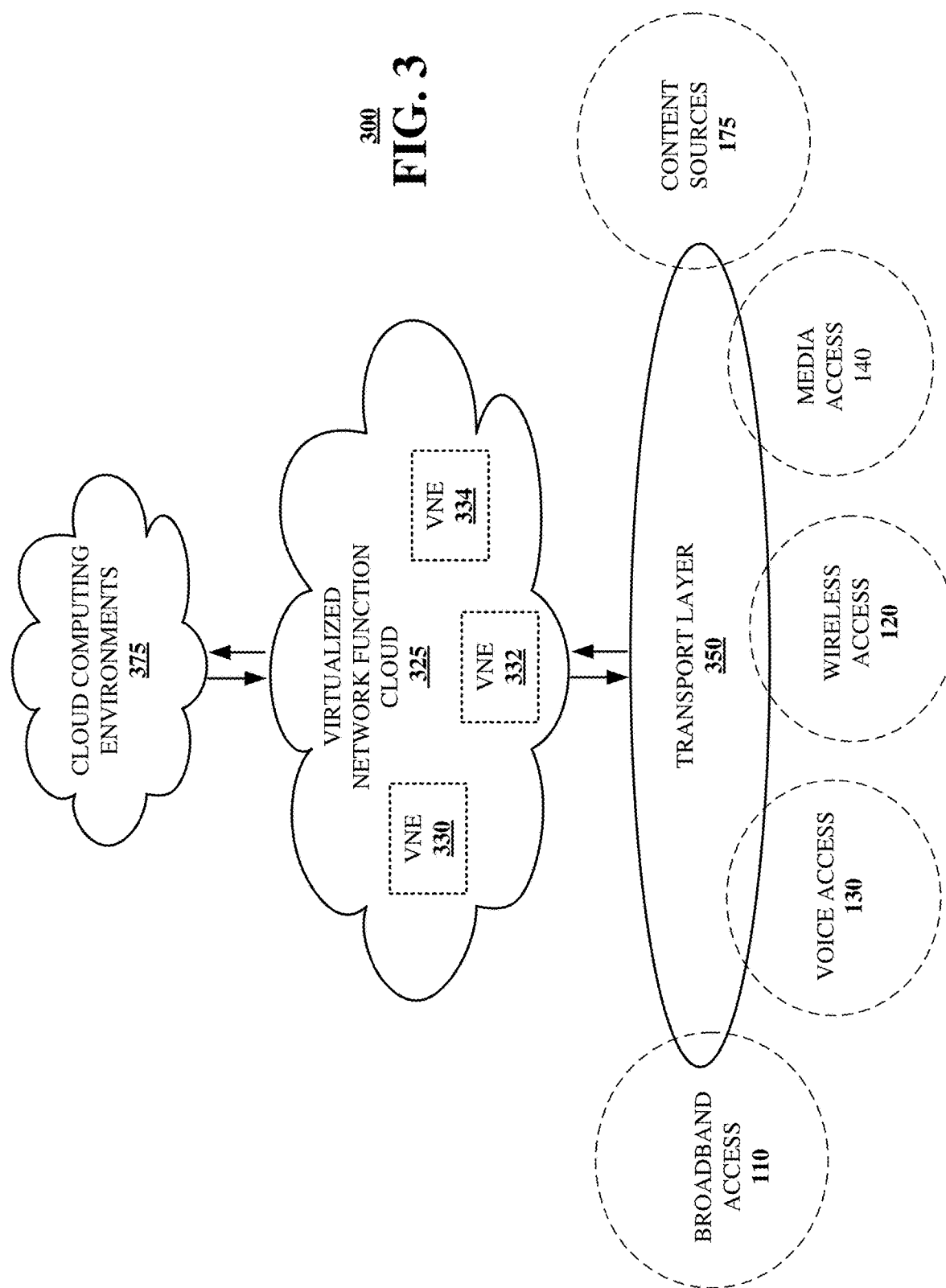

US 11,805,048 B1

DYNAMIC NETWORK METRIC SHARING AND APPLICATION METRIC BASED NETWORK PATH SELECTION

FIELD OF THE DISCLOSURE

The subject disclosure relates to network path selection with dynamic sharing of application metrics.

BACKGROUND

The networking industry is actively evolving to address challenges stemming from new applications, increased population of remote workers and the need for active network intelligence responsive to dynamic application needs. This evolution includes the ability to expose network performance metrics to enhance the path selection process.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
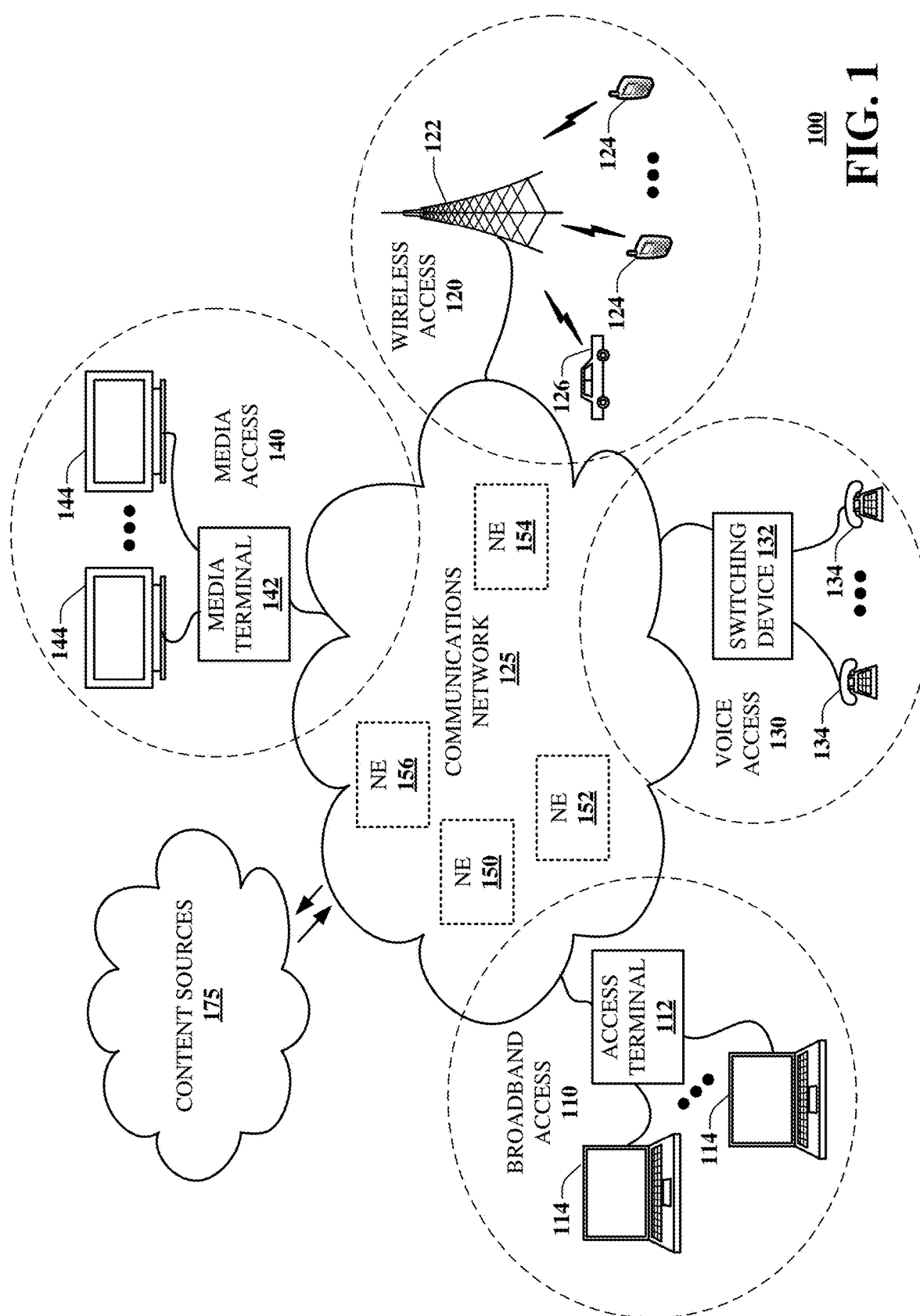
FIG. 1 is a block diagram illustrating an exemplary, non-limiting embodiment of a communications network in accordance with various aspects described herein.

The subject disclosure describes, among other things, illustrative embodiments for packaging and propagating network performance metrics from network operator equipment to consumer routers and residential gateways. A consumer router or residential gateway is able to use the network performance metrics to select a path through the network to access an application on a remote application server. The path is selected based on the performance requirements, such as latency, throughput and others, of the application. Other embodiments are described in the subject disclosure.

One or more aspects of the subject disclosure include receiving, at customer premises equipment, network performance metrics for respective paths of a plurality of paths through a network operated by a network operator, each respective path of the plurality of paths extending from the customer premises equipment to an application server for data communication by the customer premises equipment with an application running on the application server, storing the network performance metrics as stored network performance metrics in a network performance metric matrix, and identifying a primary performance metric for the application and a secondary performance metric for the application, the primary performance metric for the application and the secondary performance metric for the application identified based on performance requirements of the application. Aspects of the subject disclosure further include identifying a selected path of the plurality of paths through the network for data communication by the customer premises equipment with the application running on the application server, wherein the identifying is based on the primary performance metric for the application and a secondary performance metric for the application and the stored network performance metrics, so that the selected path satisfies the performance requirements of the application, and initiating communication between the customer premises equipment and the application server over the selected path for interaction by the customer premises equipment with the application.

One or more aspects of the subject disclosure include receiving, at a customer router in data communication with customer data processing equipment at a customer premises, network performance metrics for a plurality of paths through a network operated by a network operator, the network operated by the network operator including a plurality of router nodes, each respective path of the plurality of paths extending across the network from the customer router to an application server for data communication by the customer data processing equipment with an application running on the application server, storing the network performance metrics as stored network performance metrics in a network performance metric matrix, the network performance metric matrix arranged according to respective paths of the plurality of paths and respective network performance metrics, identifying, based on performance requirements of the application, a primary performance metric for the application and a secondary performance metric for the application, and identifying a selected path of the plurality of paths through the network for data communication by the customer data processing equipment with the application server for interaction by the customer data processing equipment with the application, wherein the identifying is based on comparing the stored network performance metrics and the primary performance metric for the application and a secondary performance metric for the application, so that the selected path satisfies the performance requirements of the application. Aspects of the disclosure further include initiating communication between the customer router and the application server over the selected path for interaction by the customer data processing equipment with the application, and receiving updates from the plurality of router nodes, the updates defining changed network performance metrics for paths of the plurality of paths due to changing network conditions.

One or more aspects of the subject disclosure include receiving network performance metrics for a plurality of paths through a network, each path extending from a customer equipment to an application server for data communication by the customer equipment with an application running on the application server, selecting a selected path among the plurality of paths, wherein the selecting is based on the network performance metrics, and communicating between the customer equipment and the application server according to the selected path. Border gateway protocol (BGP) community values (BGP CV) add BGP performance metrics community values (BPM CV) to convey network performance metrics to provider edge routers and customer premises equipment for network selection.

Referring now to FIG. 1, a block diagram is shown illustrating an example, non-limiting embodiment of a system 100 in accordance with various aspects described herein. For example, system 100 can facilitate in whole or in part receiving, at customer equipment such as a residential gateway, network performance parameters for paths through a network, and selecting a best path through the network to access an application across the network. The best path is selected based on performance requirements of the application. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
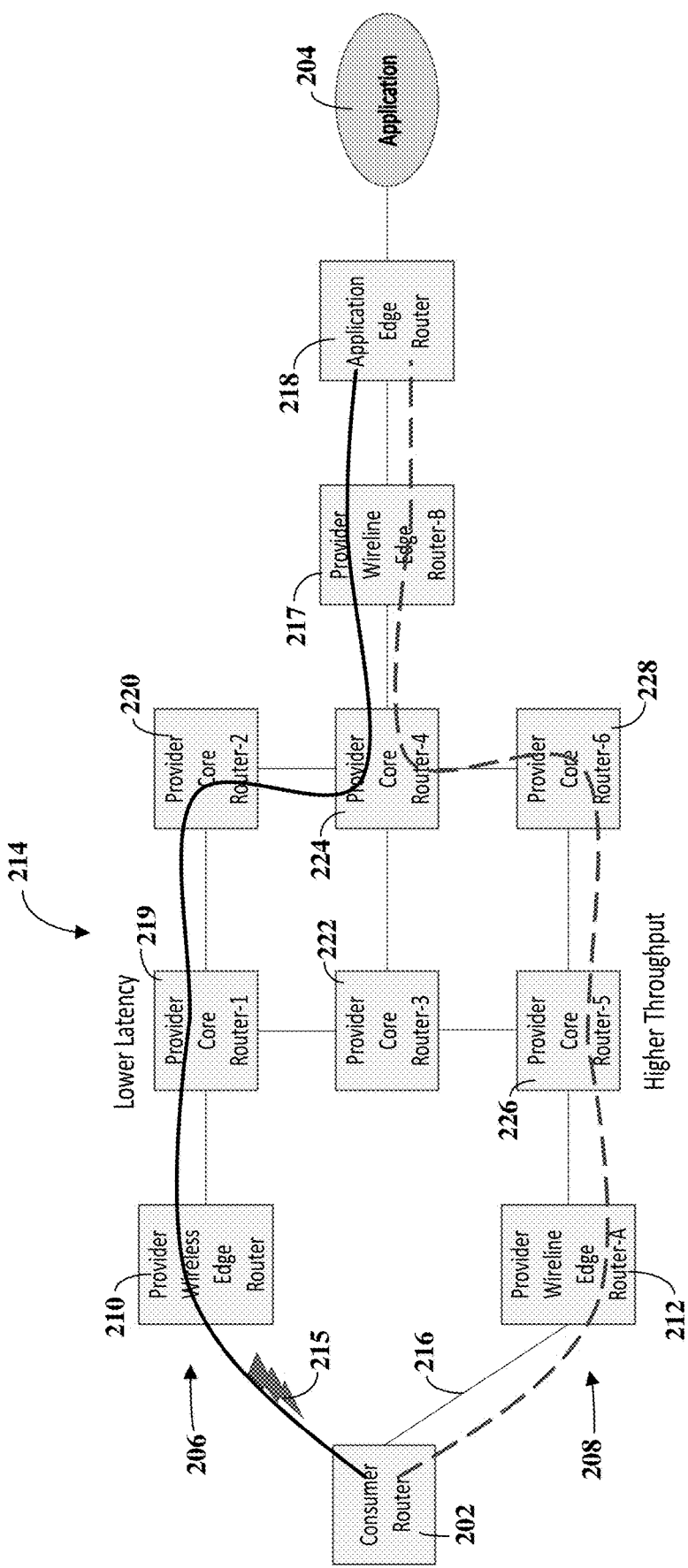
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. The system 200 illustrates aspects of a process and device enabling a network to dynamically adjust to network utilization.

Some applications that operate among processing systems on a network specify certain performance requirements. Examples of such performance requirements include a round-trip latency, packet loss percentage, etc. For example, to provide an optimal user experience, an application may require a round-trip latency of less than 50 ms. In embodiments, a process and device in accordance with various aspects herein allow a user of the application to request an improved path across the network, including a lower latency path. Further, in an example, the application may access an application programming interface (API) of the network or a network component. The API receives a specific request from the application for a lower latency path for a particular data flow and maps the request to a specific internet protocol (IP) address. The network is then programmed, for the specified data flow, to get a lower latency path across the network relative to the path currently assigned to the application. The process and device look at network metrics such as packet loss, latency and throughput. Those metrics or criteria are used to make a path selection across the network as opposed to conventional techniques which use, for example interior gateway protocol (IGP) cost or metrics of links within the network provider's network. Thus, instead of just looking inside the network provider's network to select a path, the process and device can look end-to-end at the application to make the best path decision across the network. In some cases, a better end-to-end metric results from selecting a nominally worse metric within the network provider's network.

A substantial challenge in networking is supporting applications that require specific network performance characteristics with a network solution sensitive to application flows and dynamically changing metrics within the network. For example, some applications specify low latency, high throughput, low packet loss or other key performance indicators. However, due to dynamic network topologies and variable network traffic, such performance characteristics may be difficult to maintain over time.

Currently, applications follow the best network path as computed by border gateway protocol (BGP) or other routing protocols. BGP is a gateway protocol designed to exchange routing and reachability information among systems on a network. BGP makes routing decisions based on paths, network policies or rule sets specified by a network administrator.

BGP and other routing protocols were not designed to account for application layer performance but inferred if the network path is preferred, that chosen path should provide adequate performance. However a one-size fits all approach is no longer valid and different applications have different network needs. Moreover, the lack of the ability to expose and propagate network metrics to endpoint customer routers can impair applications.

A solution is devised for network metric propagation to customer edge routers and a new application-aware path selection process. The process and device in accordance with various aspects herein looks at additional metrics that are not conventionally part of the BGP mechanism to make a better decision on behalf of the customer. Embodiments develop a new artifact to achieve that. The new artifact is designed to push active metrics to the application or to the edge router to take a completely different view on how BGP selects paths across the network. The artifact may be termed a BGP Performance Metric artifact or BPM. BPM in embodiments provides an active feed to the application. The feed is updated and changes over time with network conditions so the application can continue to evaluate the best path for the application. In applications, the process and device extend into both wireless and wireline networks as well as connections between wireless networks and wireline networks.

Conventional approaches are limited to the use of network probes which are sourced from endpoints external to the network. This may be referred to as performance routing. This may be part of a software-defined wide area network (SD-WAN) approach, for example, sending probe packets to the opposite end of the SD-WAN link. To determine if the traffic flow shall traverse wireless or wireline is a generally based on availability or responses to probes. However, probes generally only provide partial information and are typically used prior to sending traffic flows to the network. Probes only see network metrics based on a chosen BGP path. Because probes can't see alternate paths with perhaps better metrics, such probes have a significant limitation. There is no current model that takes into account active network state as reflected in the network provider's network. The network providers can detect congestion on certain links or elevated packet loss on certain network segments. However, this information is not propagated to consumer routers or edge routers to improve path decisions.

Using conventional BGP for path selection, inside the network provider's network, only cost of a link is considered. Such cost is related to a metric. When a BGP route gets to an endpoint destination, no metrics are considered at the BGP level. The metrics considered that BGP can leverage are interior gateway protocol (IGP) cost or metrics of links within the network provider's network. IGP costs are calculated as a distance between provider edge (PE) routers and translated into a metric number, for example, based on router hops or other information. The metric is determined from network entry points to network exit points for different paths, the metrics for each path are compared and the path with the lowest metric is selected. However, simply using the path with the lower metric can still result in higher packet loss or higher latency or lower throughput or other deficiencies that produce an overall less optimal result. The conventional BGP procedure does not permit selecting a path with a "worse" metric that may have other features that are more important or more germane to a particular application.

Network visibility is a central theme in current solutions where probes and other mechanisms attempt to construct a network graph but often omit key aspects of the network or its component parts. Current solutions lack active network feedback where the network provides a real-time performance view allowing path selection to change as the network changes.

The propagation of real-time network performance metrics based on tools internal to the network provider with privileged access to core and edge routers can provide actual and predictive metrics. Current paradigms have attempted to solve the challenge with new overlay algorithms. The overlay algorithm approach is based on establishing ubiquitous connectivity with many internet service providers (ISPs) in many locations in hopes of obtaining paths with optimal metrics. These overlay approaches also rely on standard BGP path attributes and thus they too have no visibility to alternate paths. However, the overlay algorithm approach does attempt to monitor the flow in real-time, but it cannot predict when the chosen path will no longer meet the need. Thus the overlay method can only react when the path metric drops below a predefined threshold. Overlay approaches are capital intensive and only function well with cloud-based applications. A method that supports cloud, enterprise and residential is desired.

In FIG. 2A system 200 illustrates exemplary communication between a consumer router 202 and an application 204. The system provides, in this example, two network paths between the consumer router 202 and the application 204. A first path 206 includes a wireless connection over a wireless network 215 between the consumer router 202 and a wireless edge router 210 operated by a network provider. The wireless network 215 and wireless communication between the consumer router 202 and the wireless edge router 210 is figuratively illustrated by a lightning bolt in the illustration. A second path 208 includes a wireline connection between the consumer router 202 and a wireless edge router 210 provided by the network operator. The system 200 further includes a provider core network 214, a second wireline edge router 217 and an application edge router 218. In the drawing figure, the wireline edge router 212 is labelled Provider Wireline Edge Router-A and the second wireline edge router 217 is labelled Provider Wireline Edge Router-B.

The consumer router 202 may be any suitable end-user equipment such as a residential gateway serving a residence, a business or any other user at a consumer premises. The consumer router 202 provides data communication between consumer equipment at the consumer premises and external networks including the first path 206 and the second path. For example, the consumer premises may include one or more computer systems including laptop and tablet computers, portable devices, and other devices requiring network access for data communication, such as streaming video, computing, data storage and access to applications. Further, the consumer premises may include one or more entertainment devices such as video equipment such as one or more televisions and audio equipment. The video and audio equipment similarly require network access for data communication, such as streaming video or audio, access to smart TV applications, etc.

In the example, the consumer router 202 communicates over a wireless network 215 with the wireless edge router 210. The wireless network 215 may be any suitable wireless data communication network such as a cellular communication network providing mobility or any other wireless network. The wireless data communication network may operate according to any suitable air interface standard such as fourth generation cellular (4G), fifth generation cellular (5G), long-term evolution (LTE), etc., and including combinations of these. In some examples, the wireless data communication network may include a wireless link to one or more satellites for communication over a satellite network to one or more terrestrial networks. The wireless communication network may share facilities among user equipment such as the consumer router 202. For example, the wireless network 215 may share frequency bandwidth, channels and time slots among users and multiplex communication among the multiple users. The wireless edge router 210 operates as a connection between the wireless network 215 and the core network 214 of the network operator. In embodiments, the wireless communication network including the wireless edge router 210 and the core network may be operated by the same network operator. In other embodiments, the wireless network 215 and the core network 214 may be operated by different entities or network operator and communicate together through the wireless edge router 210.

Further in the example embodiment of FIG. 2A, the consumer router 202 communicates over a wireline network 216 with the wireline edge router 212. The wireline network 216 may be any suitable data network such as a digital subscriber line (DSL) connection between the consumer premises and the consumer router 202 and a telephone central office (CO) or a cable television (CATC) connection to a cable provider. The wireline network 216 may include any suitable physical hardware to connect the consumer router 202 and the wireline edge router 212 such as a coaxial cable or Ethernet cable. The wireline network 216 provides broadband data communication between the core network 214 and the consumer router 202.

The core network 214 includes suitable hardware devices and software providing data communication across the core network from a data origin, such as the consumer router 202 to a data destination such as the application 204. The core network 214 includes any number of devices for data communication and such data communication may be using a packetized protocol such as transmission control protocol/internet protocol (TCP/IP) or any other suitable protocol. The data communication protocol enables routing of packets through the core network according to device availability, traffic levels and requirements of a particular transmission being routed. For example, a video game between a player at the consumer premises served by the consumer router 202 and the application 204 may require low packet delay and low latency so that the game play is not interrupted by packet delay or other communication issues and appears to the player to proceed substantially in real time, without interruption.

In the example embodiment, the core network 214 includes a first core router 219, a second core router 220, a third core router 222, a fourth core router 224, a fifth core router 226, and a sixth core router 228. Each respective core router includes, for example, a data communication interface, a processing system including at least one processor and a memory for storing data and instructions. The respective core routers may be interconnected for data communication in any suitable manner such as over high speed, high capacity Ethernet connections, other wireline connections and wireless connections. In other examples, the core network 214 may include any number of routers or other processing systems and connected in any suitable topology. The number of routers and interconnection of routers may change over time as devices are added or taken offline.

The application 204 may be any data processing system, including hardware or software or a combination, arranged for communication with a user such as the user associated with the consumer router 202. Examples include an online gaming platform that enables the user to compete in a video game with the application 204 itself, or to compete with one or more other players under coordination by the application 204. In another example, the application 204 provides streaming video to the user associated with the consumer router 202. In another example, the application 204 enables the user associated with the consumer router 202 to participate in an immersive experience such as a virtual reality (VR) experience in which scenes and characters are virtual only and created by the application. In another example, the immersive experience may be an augmented reality (AR) experience which mixed virtual elements with real-world elements experienced by the user. The user may employ user equipment such as a VR headset or AR goggles to participate in the immersive experience. Data for the immersive experience may be routed to the consumer router 202 from the application 204 over a path such as first path 206 and second path 208.

The application edge router 218 provides data communication between the application 204 and the network operated by the network provider. The second provider wireline edge router 217 interfaces for data communication with the application edge router 218. The second provider wireline edge router 217 may interface over other networks with other application routers such as the application edge router 218 to provide access to the core network 214 of the network operator and thereby provide access to users such as the user associated with the consumer router 202.

In the example embodiment, the first path 206 includes the wireless network 215 from the consumer router 202 to the wireless edge router 210, first core router 219, second core router 220, fourth core router 224, second wireline edge router 217 and application edge router 218. The second path 208 includes the wireline network 216 from the consumer router 202 to the wireline edge router 212, the fifth core router 226, the sixth core router 228, second wireline edge router 217 and application edge router 218. In this example, there is some overlap between the first path 206 and the second path 208. That is, fourth core router 224 and second wireline edge router 217 are common to both the first path 206 and the second path 208. In other examples, the overlap between the first path 206 and the second path 208 may include more or fewer routers in the core network 214.

In the example, as indicated in the drawing figure, the first path 206 is characterized by lower latency. Similarly, in the example, the second path 208 is characterized by higher throughput. That is, the lower latency is provided end-to-end, from the application 204 to the consumer router 202 over the network including the wireless edge router 210 and the wireless network 215. The higher throughput, in this example, is provided end-to-end from the application 204 to the consumer router 202 over the network including the wireline edge router 212 and the consumer router 202. The variation between data communication characteristics or key performance indicators (KPIs) may apply to any combination of factors, such as latency, throughput, packet loss, packet delay, network congestion, available bandwidth, and others that may be generally important or specifically important to a particular application.

Despite the noted variations, wireless and wireline convergence is accelerating. The two types of networks are becoming more and more similar in terms of reliability and speed. With the deployment of 5G wireless networks, in particular C-band and mmWave versions of 5G cellular, both wireline and wireless network options provide similar bandwidth capabilities and can be used jointly to provide optimum network experience. Both C-band and mmWave frequency bands offer much higher throughput than 5G Sub-3 bands due to much wider bandwidth available in C-band (3.7 to 3.98 GHz) and mmWave band (above 24 GHz). The unification of wireless and wireline on a single device such as consumer router 202 or a residential gateway exposes new opportunities to improve how networks and applications interact. Consumer routers such as small edge routers or remote gateways commonly used for broadband access at customer premises have gained functionality that permits sending traffic over wireless or wireline networks. This enables a transition to a paradigm where the network provides metrics germane to a particular application and where devices such as the customer edge router or consumer router 202 and residential gateways select paths to an application 204 based on those same metrics is fundamentally novel.

Thus, depending on the particular requirements of the application 204, either the wireless network 215 and the wireless edge router 210 or first path 206 can be selected, or the wireline network 216 and the wireline edge router 212 of second path 208 can be selected for communication between the application 204 and the user at consumer router 202. The selection can be made dynamically based on requirements including requirements of the application. For example, as network congestion changes over time, particular portions of the network may be selected to obtain improved performance as required by the application 204, the user, or the consumer router 202, or a combination of these. Network performance changes over time as there is network churn (users and user traffic increasing and decreasing dynamically), there are outage events, and other variations. In embodiments, network portions, such as the wireless network 215 with the wireless edge router 210 and the wireline network 216 with the wireline edge router 212, may be dynamically selected and switched into the path between the user at the consumer router 202 and the application 204. In embodiments, the switch is made in a way so that the user experience is not impacted. The switch may be made among network portions but the user experience, such as watching a video or playing a game at the application 204, remains steady-state as seen by the user associated with the consumer router 202.

Figure 2B:
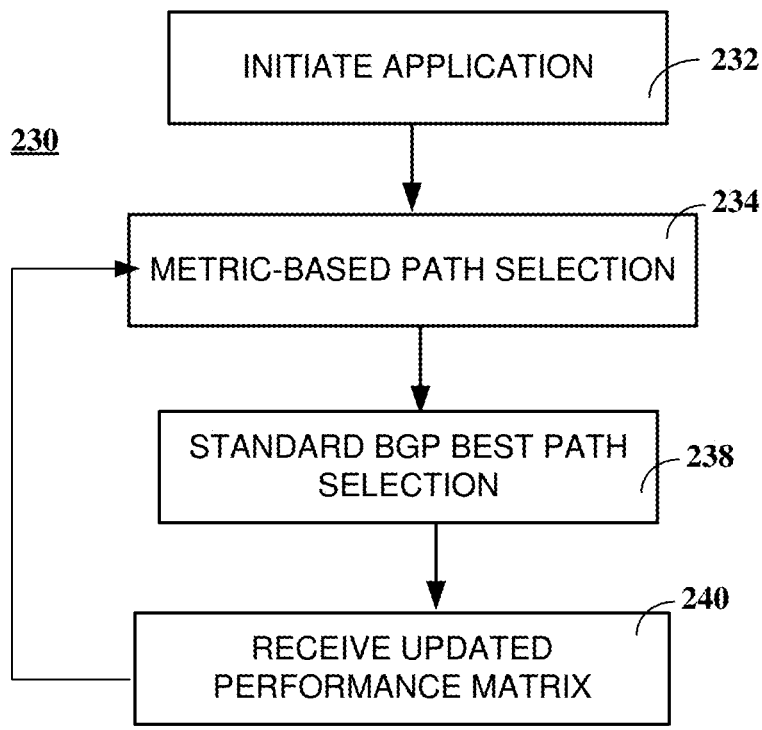
FIG. 2B depicts an illustrative embodiment of a method in accordance with various aspects described herein.

FIG. 2B depicts an illustrative embodiment of a method 230 in accordance with various aspects described herein. The method may be used for a path selection process in a system such as the system 200 in which multiple paths are available from a source device such as consumer router 202 to an application of interest such as application 204. The multiple paths in the example of FIG. 2A include a wireless path, first path 206, and a wireline path, second path 208. In other examples, more than two paths may be available, and the available paths may use multiple communication technologies, including terrestrial wireless, satellite, and so on.

FIG. 2B is an example of a path selection process with two aspects. First, a new fundamental approach is defined to package and propagate network metrics to customer edge routers and residential gateways. Second, a new path selection process is illustrated where customer edge routers and residential gateways select paths based on the provided metrics.

Network metrics such as latency, congestion, packet loss, throughput and others are known to the network provider but have not heretofore been shared externally. The method 230 updates border gateway protocol (BGP) community values (BGP CV) to store network metric data, specifically including data such as latency, packet loss and throughput. The newly defined BGP CV type may be expanded to support additional metrics. Network metrics are collected via internal performance systems of the network operator. These same systems provide a BGP feed to network provider owner devices such as provider edge router (PER) and route reflectors (RR). The performance systems are enhanced to support attachment of the new BGP CV, here called BGP performance metrics CV (BPM CV).

Network performance data is automatically collected by the network operator and stored into a BGP CV. The BGP CV may be sent to route reflectors which in turn propagate BPM CVs to provider edge routers and subsequently to customer edge routers and residential gateways. The BGP CV data is updated on an occasional or periodic basis. The interval of BGP CV updates can be tuned based on current network activity and other factors. However, in support of real-time metrics, update changes in metrics may be propagated when a change in a network metric is detected and recorded. Customer edge routers and residential gateways may be presented with two potential network path options, such as a wireline path or a wireless path as illustrated in the example of FIG. 2A. Selecting the appropriate network or path to meet the application's network performance requirements is performed by the customer edge router or residential gateway.

Individual customer edge routers and residential gateways may obtain new logic to permit an enhanced path selection process taking into account network performance metrics. A respective network path selection may be performed for each respective application flow such that applications with different performance requirements can flow over diverse network paths. For example, a Voice-over-Internet-Protocol application with a low latency requirement may flow over the 5G cellular connection of a wireless network such as wireless network 215 of FIG. 2A whereas a large file download may traverse the wireline connection such as wireline network 216 of FIG. 2A.

To achieve proper optimal path selection per application, customer edge routers and residential gateways may learn network metrics in real-time via the BPM CV. Once the BPM CV is learned, the BPM CV is unpacked and its data is stored in a newly created structure which may be referred to as a network performance matrix (NPM). The NPM is a matrix that stores standard BGP CVs and network metrics enclosed in the BGP update received from the network operator. With respect to the NPM, in embodiments, the rows reflect a specific metric such as latency. Each metric is placed in a distinct row. For example, latency may be row 1 and packet loss may be row 2. The BGP CV, or network connection reflecting the metric, is placed in the columns. In an example, a wireline network is arranged as column 1 and a 5G wireless network is arranged as column 2. The intersection of rows and columns provides the metrics for each connection type. Other arrangements may be used, including other types of matrix or other data structures. For example, a data structure that allows rapid readout of a particular value may be chosen for some applications. In other applications, a data structure that is easily expandable or collapsible to reflect newly acquired or dropped pathways to be evaluated, may be chosen.

Customer edge routers and residential gateways may obtain new path selection logic that resides above the BGP path selection algorithm to determine a best network then a best path on the best network. The best network selection algorithm is based on the network with the best metrics for the application. Each application may elect or specify a primary metric and a secondary metric. Moreover, the approach is extendable to additional metrics as needed. Using the two metric example, a gaming application may specify network bandwidth as the primary metric to be satisfied and latency as the secondary metric to be satisfied.

In an example, the connection selection algorithm selects the connection having highest bandwidth first, then compares latency values. If latency metrics are within a specific threshold, the connection with the highest throughput is chosen. If the connection with the highest bandwidth and longer latency is greater than the threshold, the algorithm will compare bandwidth. If the bandwidth metric on the connection with lower bandwidth meets the throughput need, that connection is chosen as the preferred path. The chosen path meets throughput and bandwidth needs. If the lower latency connection cannot meet the latency requirement the algorithm will revert to the connection with longer latency and higher bandwidth because bandwidth was selected as the primary metric.

Thus, the new path selection process of FIG. 2B considers network performance for the multiple paths under consideration. Method 230 incorporates a performance metric to the standard border gateway protocol (BGP) path selection process or other routing protocols. BGP is a gateway protocol designed to exchange routing and reachability information among systems on a network. BGP makes routing decisions based on paths, network policies or rule sets specified by a network administrator.

Moreover, the performance metric can be specific to an application. Some applications or classes of applications, place a greater degree or lesser degree of importance on certain performance metrics of parameters. The heightened or lessened degree of importance may be due to the nature of the data the application processes or the requirements of interaction with users or other external factors, such as data flow.

For example, a Voice over Internet Protocol (VoIP) application may have as a performance criterion selection of the network with the lowest network latency. Network latency is the term used to describe delays in communication over a network. Latency may be thought of as the amount of time required for a packet of data to be captured, transmitted, processed through multiple devices, then received at its destination and decoded. Moreover, a round-trip latency, measuring delay from origin to destination and back to origin, may also be specified. VoIP data is isochronous data and any unusual delay, exceeding a latency threshold, can be unpleasant for a party to a VoIP conversation.

In a second example, a video conferencing application may have as a performance criterion selection the network with the lowest latency and highest network throughput. Network throughput may be measured as the amount of data moved successfully from one place to another in a given time period. Throughput is typically measured in bits per second (bps), as in megabits per second (Mbps) or gigabits per second (Gbps). In video conferencing, in addition to the low latency for voice communication among participants, if several participants are on active video links, the amount of data may be very large, up to a large threshold, requiring movement of such large amounts of data among the participants.

In a third example, a gaming application may have as a performance criterion selection the network with the lowest latency and least packet loss. Packet loss refers to lost packets of data not reaching their destination after being transmitted across a network. Packet loss occurs when network congestion, hardware issues, software bugs, and a number of other factors cause dropped packets during data transmission. In a gaming application, excessive packet loss exceeding a threshold, can cause the game to appear broken or discontinuous to participants.

As indicated, some applications have performance criteria or metrics that are both required to be satisfied by a single network conveying the application the user. For example, the video conferencing application example requires both low latency and high throughput for best performance. Best performance, or acceptable performance, may be measured subjectively, by the satisfaction of participants in the application for example. Or best performance or acceptable performance may be measured by any suitable objective criteria such as a quality of service (QoS) metric. The metrics may have to be prioritized for each application and taken into account when making a decision which network to select, wireline or wireless in this example.

In the method 230, an application is initiated at a user device in communication with a consumer router, customer edge router, residential gateway or other user premises device. For example, a user associated with a customer edge router such as consumer router 202 in FIG. 2A, may activate a computing device at the customer premises and initiate the application. In an example, the user may activate a gaming system which, in turn, activates a gaming application having a local client that contacts a server application remotely located over a network of a network provider. In another example, the user may activate a video conferencing function at the user's local device. The video conferencing function in turn accesses the video conferencing server, such as application 204, located remotely across the network of a network provider.

At step 234, a metric-based path selection process occurs. The metric-based path selection process of step 234 may occur in response to any suitable input. Activation or initiation of an application at step 232 in this example initiates the metric-based path selection operation of step 234.

As indicated in FIG. 2B, step 234 makes reference to a network performance matrix to select the appropriate path. An exemplary network performance matrix 236 is illustrated in FIG. 2B. The network performance matrix 236 is exemplary only but in this example lists three performance metrics of interest along rows of the matrix, including packet loss (measured in percent), latency (measured in ms), and throughput (measured in Mbps). The network performance matrix 236 includes a first column for the wireline path, such as second path 208 in the example of FIG. 2A, and a second column for the wireless path, such as first path 206 in the example of FIG. 2A. The entries in the network performance matrix 236 are BGP community values (BGP CV) for the relevant metrics. Based on the source of the route, the entries are stamped with a community value indicating that the route came from the wireless infrastructure ($CV^{5G}$ in the figure) or that the route came from the wireline community value ($CV^{W}$ in the figure). The wireless path and the wireline path have different community values, but the community values come with the same metrics.

Based on the entries in the network performance matrix 236, a best network is selected form the application initiated at step 232. For example, the network performance matrix 236 stores values for packet loss, latency and throughput for each network, the wireless network 215 or the wireline network 216 of FIG. 2A. A processing system, such as the processing system of the consumer router 202 of FIG. 2A, compares the matrix entries for the respective metrics, for each of the wireline network and the wireless network. For example, for a Voice over Internet Protocol application, the only metric of concern may be latency. The lowest latency network among the wireline $CV^W$ network and the wireless $CV^{5G}$ network is selected. No other metric is of importance in this example for a Voice over IP application.

In embodiments, the network performance matrix 236 can be expanded to include or incorporate metric values for other available networks. For example, if there are wireline networks available and provided by two different network operators, each wireline network could be given a column in the network performance matrix 236. Further, if there is a wireless 5G cellular network and a wireless LTE network available, each wireless network could be given a column in the network performance matrix 236. The metric-based path selection process of step 234 operates to select among all networks having entries in the network performance matrix 236.

Further, while network performance matrix 236 illustrates packet loss, latency and throughput as metrics of interest and to be used for path selection, any suitable performance indicator may be specified and may be assigned to a row in the network performance matrix 236. This may include later-developed metrics of interest for applications that are developed in the future, such as augmented reality and others.

In embodiments, the consumer router 202 (FIG. 2A) or other consumer premises equipment, receive BGP UPDATE messages. BGP uses an UPDATE message to send routing updates to peers. An UPDATE message may come from any remote source, such as a server or application such as application 204 in FIG. 2A. The BGP UPDATE messages provide reachability back to the server at the source.

As the BGP UPDATE message traverses nodes of the network provider's network, the network provider's routers or other equipment attach metric data to BGP community values so that the BGP community values include the metrics illustrated in the network performance matrix 236, for example. The metric values are collected at nodes in the network provider's network and attached to BGP information forwarded by the node. In this manner, the metric values are propagated through the network to an endpoint such as the consumer router 202.

Once the community values with the metric values arrive at the consumer router or other equipment, the consumer router stores the metric values in the network performance matrix 236. The network performance matrix 236 is therefore constantly updated as new updates arrive. Updates for the wireless network entries in the network performance matrix 236 are received from the wireless network and updates for the wireline network entries in the network performance matrix 236 are received from the wireline network.

In embodiments, a new BGP artifact is defined to push active metrics to consumer/edge routers to influence network path selection. This new BGP artifact is a BGP type of community known as BGP performance metrics, or BPM. The BGP performance metrics provide an active feed to consumer routers or customer edge routers that support the BPM functionality. When the BPM is received on a consumer router or a customer edge router, the BGP community is unpacked and its metrics are stored in the network performance matrix 236. BPM from a wireless path is learned over the wireless interface and placed in the wireless column of the network performance matrix 236. Similarly, BPM from a wireline path is learned over the wireline interface and placed in the wireline column of the network performance matrix 236.

The BGP community is in effect used to identify the source network for a route, either the wireline network or the wireless network. The BGP community value just identifies where in the network performance matrix 236 to the store the metrics that are conveyed.

Step 234 produces as a result a selection of one of the wireless or wireline networks, based on the network performance matrix 236. Step 234 makes a choice between identical paths received on two different network modes, wireline mode or wireless mode in this example. Step 234 implements metric-based selection with the result that one of the wireless and wireline networks is given a higher priority.

At step 238, a standard BGP best path selection operation is performed. Once the chosen connection or path is selected, the paths from that connection are tagged with BGP path attributes to influence path selection at the BGP level. Conventional BGP best path selection operates to select a path through a network based on BGP attributes such as Weight, Local Preference, Originate, AS Path Length, Origin Code, MED, and others as conventionally used. BGP operates to select the best path based on the list of attributes. However, the metric-based path selection operation of step 234 sets the weight of the selected network, either wireline or wireless, to have the highest weight.

At step 240, the consumer router receives updated performance matric information for the network performance matrix 236. In embodiments, the data of the network performance matrix 236 is continuously being updated with information from the network provider's network. For example, a BGP update can come from any source at a far end such as a gaming server, a video server, etc. BGP uses an UPDATE message to send routing updates to peers. When a BGP session is initialized, UPDATE messages are sent until the complete BGP table has been exchanged and provided to a device such as the consumer router. Every time an UPDATE message is received, the BGP route table is updated and the BGP route table version number is incremented. Similarly, every time an UPDATE message is received, the network performance matrix 236 is updated with BGP community values and metrics stored therein.

Because the network performance matrix 236 is actively updated, changes to the network performance matrix 236 can result in traffic flows transitioning from wireline to wireless and vice versa. Network conditions vary over time, and this affects network metrics including network congestion, packet loss, throughput, and others. As a result, after updating the network performance matrix 236 at step 240, control may return to step 234 and a new path selection operation may occur using the updated contents of the network performance matrix 236 and based on the updated metrics.

Figure 2C:
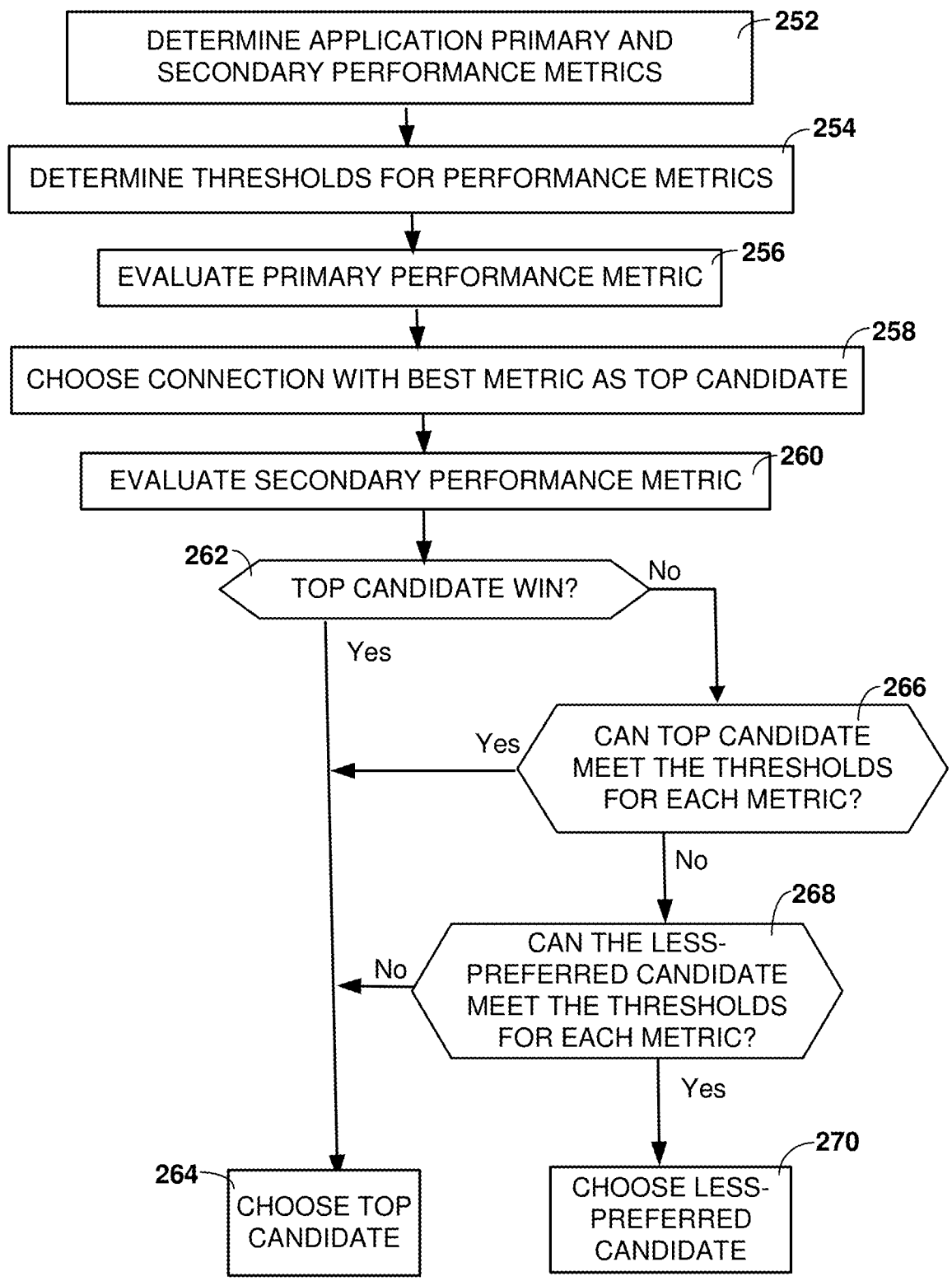
FIG. 2C depicts an illustrative embodiment of a method in accordance with various aspects described herein.

FIG. 2C depicts an illustrative embodiment of a method 250 in accordance with various aspects described herein. In particular, the method 250 illustrates and embodiment of a method for metric-based path selection which may implement step 234 of FIG. 2B. Method 250 may be called or initiated in response to initiation of an application by a user. For example, a user may initiate a gaming device to launch an online gaming application in which the local gaming application client interacts with a remote server application over a network operated by a network operator. The gaming device accesses the network through user equipment at the user premises, such as a consumer router, a customer edge router or a residential gateway. In another example, the user initiates a Voice over IP phone call or other communication session over a computing device, where the computing device is in data communication with the network operated by the network operator. The VoIP call accesses the network through user equipment at the user premises, such as a consumer router, a customer edge router or a residential gateway. The VoIP phone call accesses a remote application for call processing.

In accordance with some embodiments, each application that may be used by the user device has associated therewith a primary performance metric and a secondary performance metric. In an example, a gaming application may be associated with a primary performance metric of low latency and a secondary performance characteristic of low packet loss. Similarly, a video conferencing application may be associated with a primary performance metric of low latency and a secondary performance characteristic of high throughput. In some embodiments, additional performance metrics, such as tertiary performance metrics or quaternary performance metrics, may be specified as well. The method 250 may be readily adapted accordingly to address more than two performance metrics.

In step 252, method 250 includes an operation of identifying an application requiring communication over the network and determining for the application the primary performance metric and the secondary performance metric. The determination of the primary performance metric and the secondary performance metric may be performed in any suitable manner, such as looking the information up in storage at the local device, retrieving the information from a remote location over the network, or reading the information directly from the application itself.

At step 254, method 250 includes an operation of determining acceptable or permitted thresholds for the primary performance metric and the secondary performance metric identified in step 252. For example, a packet loss metric may have a maximum percent packet loss threshold specified, such as 5% or 15% packet loss. Any amount of packet loss exceeding the maximum percent packet loss threshold may be considered out of specification and unacceptable. In contrast, an amount of packet loss less than the maximum percent packet loss threshold may be considered acceptable. Further, the extent to which a performance metric is within a threshold value may be considered as well. For example, a communication channel with 2% packet loss would be considered better or preferable to a communication channel with 5% packet loss, even when the threshold is 15% packet loss. In another example, a latency performance metric may have a maximum threshold measured in ms, such as 5 ms or 25 ms. Similarly, a throughput performance metric may have a minimum threshold measured in Mbps, such as 50 Mbps or 200 Mbps. Other performance metrics will have other minimum or maximum thresholds associated therewith. Some performance metrics may be specified for an acceptable range, with a minimum threshold and a maximum threshold.

To determine the best connection or path available at the consumer premises equipment for operating the application, the method 250 accesses a network performance matrix. At step 256, the method 250 includes an operation of evaluating the primary performance metric specified for the application. In embodiments, a network performance matrix such as network performance matrix 236 (FIG. 2B) may be consulted. The network performance matrix contains values for performance metrics of interest, for networks of interest or available. In the example of FIG. 2A, a wireless network 215 reports performance metrics for the wireless network. Consumer premises equipment such as the consumer router 202 formats the network performance matrix and stores in the network performance matrix the performance metric data. The consumer premises equipment, for example, receives BGP community values containing the performance metrics for the network.

Thus, in accordance with step 256, the value of the primary performance metric (matrix row) for each available network (matrix column) in the network performance matrix is determined, such as by reading the data from the stored network performance matrix. Further, the retrieved values of the primary performance metric are compared and compared with an associated threshold for the primary performance metric determined in step 254. Each primary performance metric is associated with a connection or network or network type available at the customer premises for accessing an application such as application 204 over core network 214 (FIG. 2A). In the example of FIG. 2A, a connection to the wireless network 215 is available and a connection to the wireline network 216 is available.

At step 258, method 250 includes a process of choosing the connection with the best performance metric value as the top candidate connection. The top candidate connection may be, for example, the connection that will provide the best quality connection for accessing the remote application over the network, based on performance metrics. Because network parameters may change over time, the network performance matrix is regularly updated with the most current information about network performance metrics for each network. Choosing a connection with the best performance metric value may be done in any suitable manner, such as by choosing the connection whose performance metric most exceeds a minimum threshold, such as exceeding a minimum threshold 20 Mbps for data throughput. The network or connection that provided 50 Mbps for data throughput would be identified as the top candidate over the network or connection that provided 25 Mbps, where the throughput threshold is 20 Mbps. Both connections are acceptable relative to the threshold but the 50 Mbps connection is likely to provide better or best results in terms of throughput, so that connection is identified as the top candidate connection. However, the top candidate connection is just a candidate, to be further evaluated before being selected as the connection to use for accessing the application over the network.

At step 260, the secondary performance metric is evaluated. The evaluation of the secondary performance metric may be similar to evaluation of the primary performance metric in step 256. For example, the value of the secondary performance metric (matrix row) for each available network (matrix column) in the network performance matrix is determined, such as by reading the data from the stored network performance matrix. Further, the retrieved values of the secondary performance metric are compared and compared with an associated threshold for the secondary performance metric determined in step 254.

At step 260, it is determined if the top candidate connection, identified at step 258 as the network connection having the best primary performance metric, also has the best secondary performance metric. For example, a wireline network may have the lowest latency and the highest throughput of the connections evaluated (for example, the wireless network 215 and the wireline network 216 of FIG. 2A) for a video conferencing application. In that case, the top candidate connection, the wireline network, is considered the winner or the best connection for accessing the application from the consumer equipment over the network of the network provider. Control proceeds to step 264 and the top candidate connection, identified at step 258 and confirmed at step 262, is selected or chosen as the connection.

On the other hand, if evaluation of the secondary performance metric results in the top candidate connection not being the best metric, the method 250 refers to the performance metric thresholds associated with the application and determined at step 254. At step 266, the method 250 determines if the top candidate connection can meet the thresholds for both the primary performance metric and the secondary performance metric (as well as other performance metrics, if specified). For example, among two candidate connections such as wireless network 215 and wireline network 201 of FIG. 2A, the wireline network 216 may be considered the top candidate connection because it has the best primary performance metric value, such as the lowest latency relative to the wireless network 215. If the wireline network 216 does not have the best or highest throughput value relative to the wireless network 215, at step 266 the value for the primary performance metric, latency, and the value for the secondary performance metric, throughput, are respectively compared with the respective threshold values for the primary performance metric and the secondary performance metric. If at step 266, the top candidate connection, identified at step 258, has performance metric values (read, for example, from the network performance matrix 236, that exceed both the primary threshold and the secondary threshold, then the top candidate connection is identified as the winner or best connection for communicating with the application over the network at step 264.

Should the top candidate connection not meet threshold of the second performance metric, the method 250 determines at step 268 if a less-preferred candidate meets both the primary performance metric threshold and the secondary performance metric threshold for the application. For example, at step 256, the primary performance metric was evaluated for each available connection. In the example of FIG. 2A, this included the wireless network 215 and the wireline network 216. Further in this example, the wireline network 216 was chosen as the best top candidate network at step 258. As a result, the remaining connection evaluated at step 256 but not chosen as the top candidate connection is the wireless network 215. Thus, for step 268, the wireless network 215 in this example is the less-preferred network, relative to the top candidate connection or wireline network 216. If more than two connections are available and have data stored in the network performance matrix 236, the comparison of step 256 may produce a ranked list of candidate connections. The list is ranked according to the primary performance metric. The candidate connection with the best primary performance metric is ranked first and identified as the top candidate connection. The candidate connection with the next best primary performance metric is ranked second and identified as the less-preferred candidate connection. At step 256, if the less-preferred candidate meets both the primary performance metric threshold and the secondary performance metric threshold for the application, the less preferred candidate path is chosen as the best path at step 270 and the network identified as the less preferred candidate will be used to connect the user premises equipment to the application over the network.

On the other hand, if at step 268, the less preferred candidate connection cannot meet both the primary performance metric threshold and the secondary performance metric threshold for the application, meaning both the top candidate connection and less preferred candidate connection cannot meet the second performance metric threshold, then control proceeds to step 264 and the top candidate connection is selected and used to connect the user premises equipment to the application over the network.

The method 250 may be repeated with any suitable frequency or periodicity. In embodiments, the data of the network performance matrix 236 is continuously being updated with information from the network provider's network. This updating process reflects changes in the network due to, for example varying traffic levels, devices being taken offline, or new network nodes being added. The updating of the information in the network performance matrix 236 may change one or more decisions made at steps of the method 250. Accordingly, the method 250 may be performed at suitable times, such as hourly or every 15 minutes to ensure that the best connection is selected, based on current network performance metrics. The interval of updates can be tuned or selected based on current network activity and other factors. For example, if traffic congestion is increasing in the network, or throughput is increasing, the interval for updates can be shortened to provide more current information for the path selection process. However, in support of real-time metrics, update changes in metrics may be propagated when a change in a network metric is detected and recorded.

While for purposes of simplicity of explanation, the respective processes are shown and described as a series of blocks in FIGS. 2B and 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 230 presented in FIGS. 1, 2A, 2B, 2C, and 3. For example, virtualized communication network 300 can facilitate in whole or in part receiving, at customer equipment such as a residential gateway, network performance parameters for paths through a network, and selecting a best path through the network to access an application across the network. The best path is selected based on performance requirements of the application.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third party locations.

Figure 4:
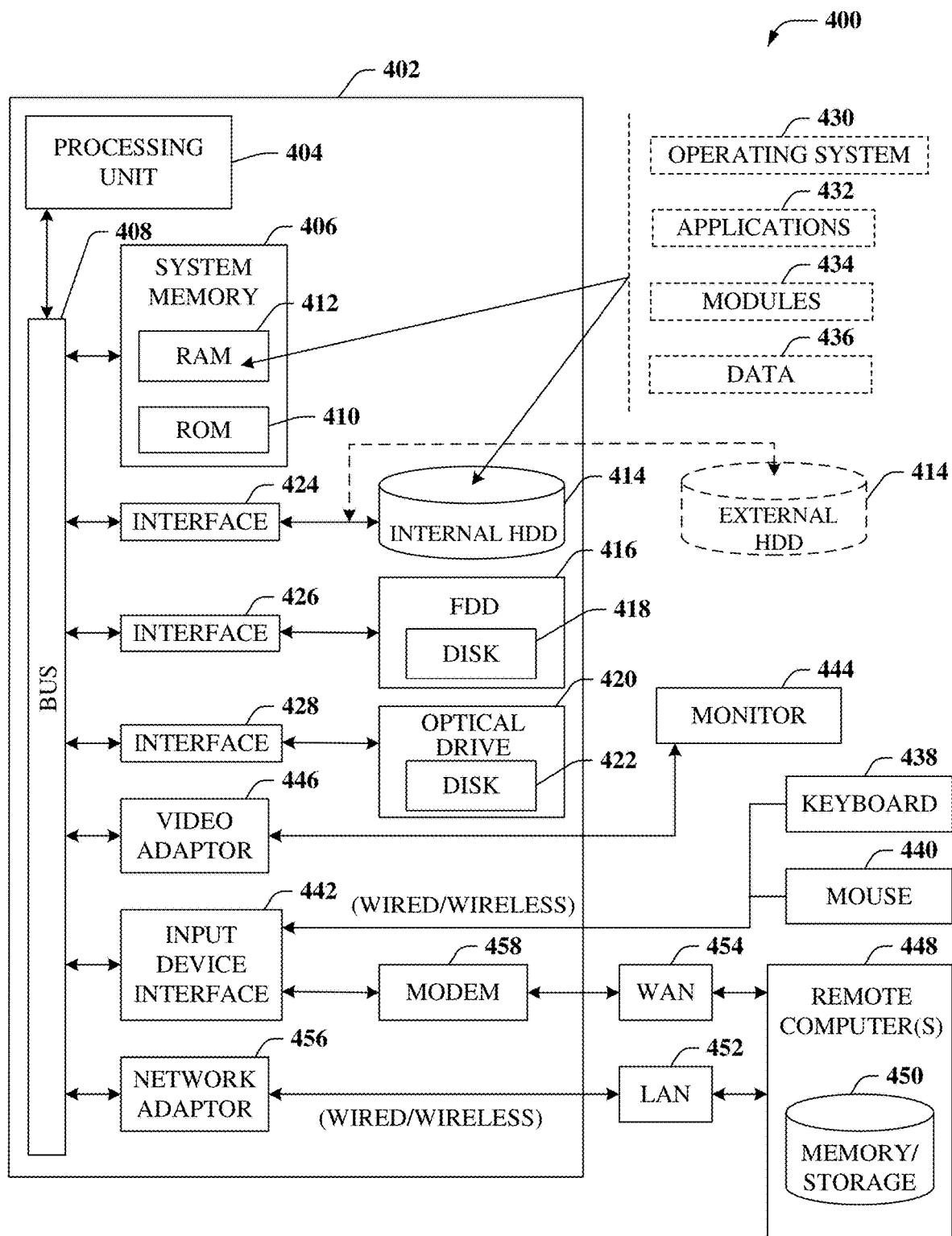
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part receiving, at customer equipment such as a residential gateway, network performance parameters for paths through a network, and selecting a best path through the network to access an application across the network. The best path is selected based on performance requirements of the application.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/ or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
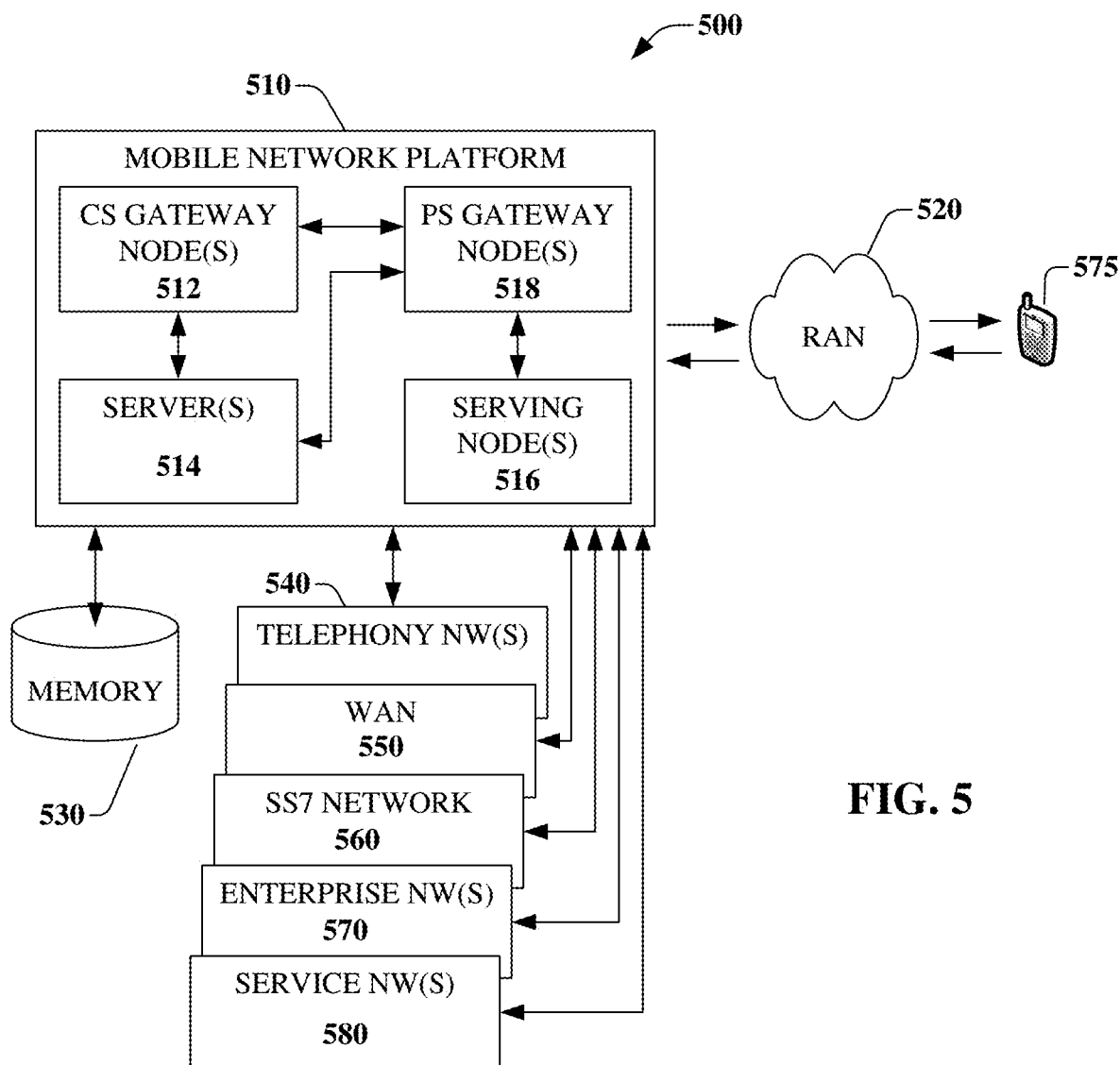
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part receiving, at customer equipment such as a residential gateway, network performance parameters for paths through a network, and selecting a best path through the network to access an application across the network. The best path is selected based on performance requirements of the application. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
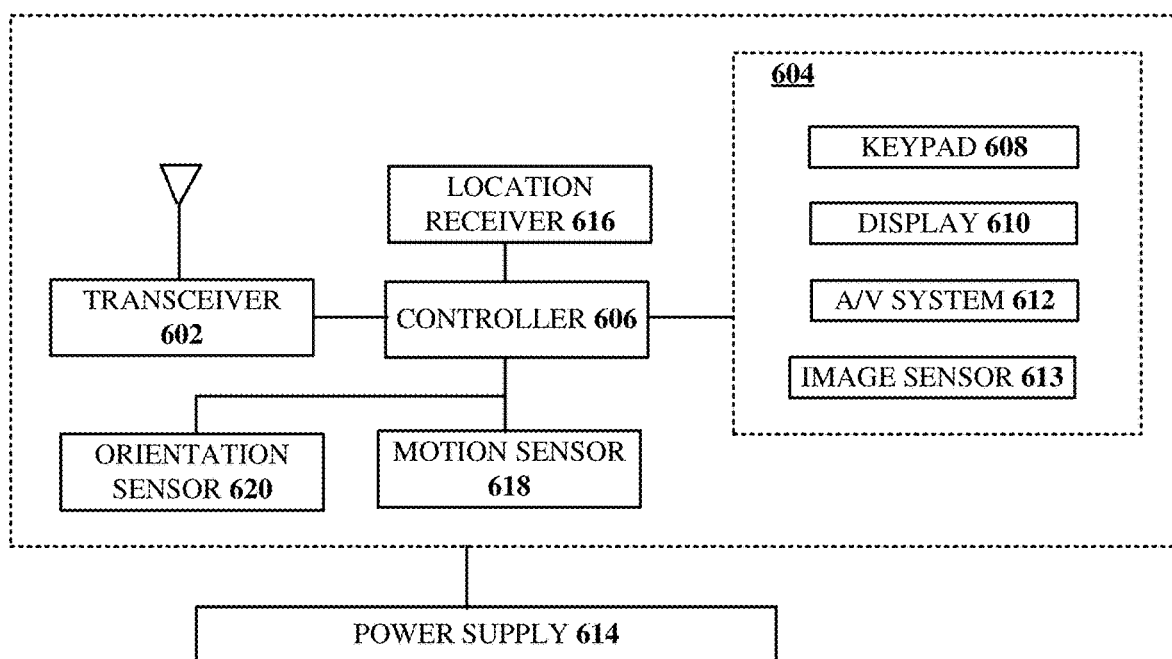
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part receiving, at customer equipment such as a residential gateway, network performance parameters for paths through a network, and selecting a best path through the network to access an application across the network. The best path is selected based on performance requirements of the application.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
receiving, at customer premises equipment, network performance metrics for respective paths of a plurality of paths through a network operated by a network operator, each respective path of the plurality of paths extending from the customer premises equipment to an application server for data communication by the customer premises equipment with an application running on the application server;
storing the network performance metrics as stored network performance metrics in a network performance metric matrix;
identifying a primary performance metric for the application and a secondary performance metric for the application, the primary performance metric for the application and the secondary performance metric for the application identified based on performance requirements of the application;
identifying a selected path of the plurality of paths through the network for data communication by the customer premises equipment with the application running on the application server, wherein the identifying of the selected path is based on the primary performance metric for the application, the secondary performance metric for the application, and the stored network performance metrics, so that the selected path satisfies the performance requirements of the application, wherein a first path of the plurality of paths is preferred as the selected path relative to a second path of the plurality of paths in accordance with the primary performance metric and the stored network performance metrics, wherein the second path is preferred as the selected path relative to the first path in accordance with the secondary performance metric and the stored network performance metrics, wherein the selected path corresponds to the first path when a first value of the stored network performance metrics corresponding to the first path exceeds a first threshold associated with the primary performance metric and a second value of the stored network performance metrics corresponding to the first path exceeds a second threshold associated with the secondary performance metric, and wherein the selected path corresponds to the second path when a third value of the stored network performance metrics corresponding to the second path exceeds the first threshold and a fourth value of the stored network performance metrics corresponding to the second path exceeds the second threshold; and initiating communication between the customer premises equipment and the application server over the selected path for interaction by the customer premises equipment with the application.

2. The device of claim 1, wherein the operations further comprise:

receiving, at the customer premises equipment, updated network performance metrics for particular paths of the plurality of paths through the network;

storing the updated network performance metrics as stored updated network performance metrics in the network performance metric matrix;

selecting a new selected path based on the primary performance metric for the application and a secondary performance metric for the application and the stored updated network performance metrics; and switching communication between the customer premises equipment and the application server from the selected path to the new selected path.

3. The device of claim 1, wherein the receiving network performance metrics comprises:

receiving, from routers of the network operated by the network operator, border gateway protocol performance metric (BPM) community values, each respective BPM community value storing a respective network performance metric value for a network performance metric;

unpacking the BPM community values to obtain current network performance metric values for a network performance metric; and storing the current network performance metric values in the network performance metric matrix.

4. The device of claim 3, wherein the receiving BPM community values comprises:

receiving border gateway protocol (BGP) community values (BGP CV), the BGP CV storing network metric data determined by the routers of the network operated by the network operator, the network metric data including values for at least one of latency, packet loss and throughput for respective paths of the plurality of paths.

5. The device of claim 3, wherein the storing the current network performance metric values in the network performance metric matrix comprises:

storing the current network performance metric values in columns of the network performance metric matrix and in rows of the network performance metric matrix, wherein respective columns of the network performance metric matrix correspond to respective paths of the plurality of paths through the network and wherein respective rows of the network performance metric matrix correspond to respective network performance metric values.

6. The device of claim 1, wherein the receiving network performance metrics for respective paths of a plurality of paths through the network comprises:

receiving network performance metrics for a wireless network between the customer premises equipment and a provider wireless edge router of the network operator; and receiving network performance metrics for a wireline network between the customer premises equipment and a provider wireline edge router of the network operator.

7. The device of claim 1, wherein the operations further comprise:

tagging the selected path with border gateway protocol (BGP) path attributes to influence path selection in a BGP process; and performing a BGP best path selection operation to select the selected path based on the BGP path attributes.

8. A non-transitory machine-readable medium, comprising executable instructions that, when executed by a processing system including a processor, facilitate performance of operations, the operations comprising:

receiving, at a customer router in data communication with customer data processing equipment at a customer premises, network performance metrics for a plurality of paths through a network operated by a network operator, the network operated by the network operator including a plurality of router nodes, each respective path of the plurality of paths extending across the network from the customer router to an application server for data communication by the customer data processing equipment with an application running on the application server;

storing the network performance metrics as stored network performance metrics in a network performance metric matrix, the network performance metric matrix arranged according to respective paths of the plurality of paths and respective network performance metrics;

identifying, based on performance requirements of the application, a primary performance metric for the application and a secondary performance metric for the application; and identifying a selected path of the plurality of paths through the network for data communication by the customer data processing equipment with the application server for interaction by the customer data processing equipment with the application, wherein the identifying of the selected path is based on comparing the stored network performance metrics to the primary performance metric for the application and the secondary performance metric for the application, so that the selected path satisfies the performance requirements of the application, wherein a first path of the plurality of paths is preferred as the selected path relative to a second path of the plurality of paths in accordance with the primary performance metric and the stored network performance metrics, wherein the second path is preferred as the selected path relative to the first path in accordance with the secondary performance metric and the stored network performance metrics, wherein the selected path corresponds to the first path when a first value of the stored network performance metrics corresponding to the first path exceeds a first threshold associated with the primary performance metric and a second value of the stored network performance metrics corresponding to the first path exceeds a second threshold associated with the secondary performance metric, and wherein the selected path corresponds to the second path when a third value of the stored network performance metrics corresponding to the second path exceeds the first threshold and a fourth value of the stored network performance metrics corresponding to the second path exceeds the second threshold;

initiating communication between the customer router and the application server over the selected path for interaction by the customer data processing equipment with the application; and receiving updates from the plurality of router nodes, the updates defining changed network performance metrics for paths of the plurality of paths due to changing network conditions.

9. The non-transitory machine-readable medium of claim 8, wherein the operations further comprise:

selecting a new selected path based on the primary performance metric for the application and a secondary performance metric for the application and the changed network performance metrics; and switching communication between the customer data processing equipment and the application server from the selected path to the new selected path.

10. The non-transitory machine-readable medium of claim 8, wherein the receiving network performance metrics comprises:

receiving, from router nodes of the plurality of router nodes, border gateway protocol performance metric (BPM) community values, each respective BPM community value storing a respective network performance metric value for a network performance metric;

unpacking the BPM community values to obtain current network performance metric values for a network performance metric; and storing the current network performance metric values in the network performance metric matrix.

11. The non-transitory machine-readable medium of claim 10, wherein the receiving BPM community values comprises:

receiving border gateway protocol (BGP) community values (BGP CV), the BGP CV storing network metric data determined by the router nodes.

12. The non-transitory machine-readable medium of claim 8, wherein the operations further comprise:

receiving updates from the plurality of router nodes at an interval, the interval being tunable according to network conditions.

13. A method, comprising:

receiving, by a processing system including a processor, network performance metrics for a plurality of paths through a network, each path extending from a customer equipment to an application server for data communication by the customer equipment with an application running on the application server;

selecting, by the processing system, a selected path among the plurality of paths, wherein the selecting is based on the network performance metrics, wherein a first path of the plurality of paths is preferred as the selected path relative to a second path of the plurality of paths in accordance with a primary performance metric and the network performance metrics, wherein the second path is preferred as the selected path relative to the first path in accordance with a secondary performance metric and the network performance metrics, wherein the selected path corresponds to the first path when a first value of the network performance metrics corresponding to the first path exceeds a first threshold associated with the primary performance metric and a second value of the network performance metrics corresponding to the first path exceeds a second threshold associated with the secondary performance metric, and wherein the selected path corresponds to the second path when a third value of the network performance metrics corresponding to the second path exceeds the first threshold and a fourth value of the network performance metrics corresponding to the second path exceeds the second threshold; and communicating, by the processing system, between the customer equipment and the application server according to the selected path.

14. The method of claim 13, comprising:

receiving, by the processing system, updated network performance metrics for one or more paths of the plurality of paths through the network; and reselecting, by the processing system, a new selected path among the plurality of paths, wherein the reselecting is based on the updated network performance metrics.

15. The method of claim 13, wherein the receiving network performance metrics comprises:

receiving, by the processing system, border gateway protocol (BGP) community values from nodes of the network; and determining, by the processing system, the network performance metrics based on the BGP community values.

16. The method of claim 13, comprising:

storing, by the processing system, the network performance metrics in a network performance metric matrix, wherein the network performance metric matrix includes a respective set of entries for each respective path of the plurality of paths and wherein the network performance metric matrix includes a respective set of second entries for each respective network performance metric, wherein an intersection of each respective set of entries and each respective set of second entries corresponds to a particular network performance metric for a particular path of the plurality of paths; and identifying, by the processing system, for the application, the primary performance metric and the secondary performance metric, wherein the selecting of the selected path is based on entries of the network performance metric matrix.

17. The method of claim 16, comprising:

receiving, by the processing system, updated network performance metrics for one or more paths of the plurality of paths through the network; and storing, by the processing system, the updated network performance metrics in the network performance metric matrix to form updated entries of the network performance metric matrix including the particular network performance metric for the particular path of the plurality of paths; and selecting, by the processing system, a new selected path based on the primary performance metric and the secondary performance metric and the updated entries of the network performance metric matrix.

18. The method of claim 16, comprising:

receiving, by the processing system, border gateway protocol performance metric (BPM) community values, each respective BPM community value storing a respective network performance metric value for a network performance metric;

unpacking, by the processing system, the BPM community value to obtain a current network performance metric value for a network performance metric; and storing, by the processing system, the current network performance metric value in the network performance metric matrix as a stored particular network performance metric for an identified path of the plurality of paths.

19. The method of claim 13, wherein the selected path corresponds to the first path when the third value of the network performance metrics corresponding to the second path is less than the first threshold.

20. The method of claim 19, wherein the selected path corresponds to the first path when the fourth value of the network performance metrics corresponding to the second path is less than the second threshold.

* * * * *